United States Patent
Barry et al.

(10) Patent No.: US 6,731,883 B1
(45) Date of Patent: May 4, 2004

(54) SYSTEM AND METHOD FOR DEMULTIPLEXING IN OPTICAL COMMUNICATION SYSTEMS

(75) Inventors: Liam Barry, Auckland (NZ); John Harvey, Auckland (NZ); John Dudley, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 09/623,019

(22) PCT Filed: Feb. 25, 1999

(86) PCT No.: PCT/NZ99/00023
§ 371 (c)(1),
(2), (4) Date: Nov. 6, 2000

(87) PCT Pub. No.: WO99/44320
PCT Pub. Date: Sep. 2, 1999

(51) Int. Cl.[7] .................................................. H04B 10/06
(52) U.S. Cl. ........................................................ 398/207
(58) Field of Search ................ 398/207, 52; 250/214.1, 250/214 R, 214 LA, 214 LS

(56) References Cited

U.S. PATENT DOCUMENTS

| | | |
|---|---|---|
| 3,909,749 A | 9/1975 | Weber |
| 4,558,923 A | 12/1985 | Hoffman et al. |
| 5,828,679 A * | 10/1998 | Fisher ............................ 372/6 |
| 5,861,981 A | 1/1999 | Jabr |
| 6,023,360 A * | 2/2000 | Morioka et al. ................ 398/1 |

FOREIGN PATENT DOCUMENTS

| | | |
|---|---|---|
| DE | 195 16 262 A1 | 10/1996 |
| EP | 0 143 000 A1 | 5/1985 |
| EP | 0 812 067 A1 | 12/1997 |

OTHER PUBLICATIONS

Asobe, M., et al; "Applications of Highly Nonlinear Chalcogenide Glass Fibers in Ultrafast All–Optical Switches"; IEEE Journal of Quantum Electronics vol. 29, No. 8, (1993).

Aitchison et al; "The Effect of Two–Photon Absorption on the Operation of an Ultrafast Semiconductor Switching Device"; LEOS 89 17–20 (1989); pp. 51, 52, 15.

* cited by examiner

Primary Examiner—Jason Chan
Assistant Examiner—Shi K. Li
(74) Attorney, Agent, or Firm—Nixon & Vanderhye

(57) ABSTRACT

A demultiplexer and method for a high speed time division multiplex optical communication system uses an optoelectronic device in which two photon absorption can occur configured in circuit. The received optical multi-channel signal and a control optical signal at the repetition rate of and synchronized to the selected channel to be detected are applied to the device, which is configured in circuit as to generate by non-linear two photon absorption effect a current similar to the original signal.

10 Claims, 3 Drawing Sheets

SYSTEM AND METHOD FOR DEMULTIPLEXING IN OPTICAL COMMUNICATION SYSTEMS

FIELD OF INVENTION

The invention comprises a system and method for demultiplexing a multiplexed signal in a high speed optical communication system such as a fibre optic based communication system.

BACKGROUND TO INVENTION

The availability of a stable, compact and robust ultra-fast switch is essential for the future development of high speed optical communication systems based on optical time division multiplexing (OTDM). To achieve demultiplexing in very high capacity OTDM systems it is necessary to use all-optical switching devices based on instantaneous optical non-linearities. Two high speed all-optical demultiplexers already demonstrated are the non-linear optical loop mirror (NOLM) based on the Kerr effect in optical fibres, and the terahertz optical asymmetric demultiplexer (TOAD) based on non-linearities associated with carrier depletion in semiconductor optical amplifiers (SOAs). NOLM and TOAD-based demultiplexers have demonstrated all-optical demultiplexing in systems operating at up to 640 Gbit/s. However high speed switching in the NOLM requires speciality fibre and precise wavelength control of signal and control pulses about the fibre zero dispersion wavelength, while with TOAD gain depletion in the SOA has been shown to limit the minimum control pulsewidth and thus the maximum switching speed.

SUMMARY OF INVENTION

In broad terms in one aspect the invention comprises a demultiplexer in an optical communication system, comprising an opto-electronic device in which two photon absorption can occur configured in circuit, and means to apply the received optical multichannel signal to the device, and means to apply a control optical signal to the device at the repetition rate of and synchronised to the selected channel to be detected, to generate by non-linear two photon absorption effect in the device a current similar to the original signal.

In broad terms in another aspect the invention comprises a method of demultiplexing a selected channel in an optical communication system, comprising applying the received optical multichannel signal to an opto-electronic device in which two photon absorption can occur configured in circuit and applying a control optical signal to the device which is at the repetition rate of and is synchronised to the selected channel to be detected, to generate by non-linear two photon absorption effect in the device a current similar to the original signal.

The invention utilises two photon absorption effect or TPA in an OTDM demultiplexing system and method. TPA is a non-linear phenomenon in opto-electronic devices in which two photons are absorbed simultaneously to generate a single electron hole pair. The opto-electronic switching device may be any form of optical detector or opto-electronic device such as laser diode for example, or any other suitable semiconductor wave guide structure that generates electrical carriers across a junction when exposed to light. The wavelength of the non-linear device should be less than the wavelength of the received light so that the energy required to overcome the band gap in the junction of device is greater than the energy in the light that will be received in use—so that significant current is only generated in the device by two photon absorption in accordance with the invention rather than linearly.

In the invention the high speed OTDM signal and the control optical pulses at the repetition rate of the individual channel in the OTDM signal are simultaneously injected into the opto-electronic switching device. The wavelength of the OTDM signal and control pulses is such that the injected photons do not contain enough energy to generate electron-hole pairs via linear absorption. However, electron-hole pairs will be generated by two photon absorption effect in the device, and due to the non-linear nature of TPA the number of earners generated in the external circuit is proportional to the square of the incident power. The peak power of the signal pulses is such that the electrical signal generated when they are injected into the diode on their own is negligible. With the higher optical power control pulse train synchronised with one of the data signal pulse trains in the OTDM signal, the signal pulses will generate a significant electrical signal in the external circuit due to the non-linear TPA effect.

BRIEF DESCRIPTION OF FIGURES

The invention will be further described with reference to the accompanying figures, by way of example and without intending to be limiting, wherein.

DETAILED DESCRIPTION

Figure 1:
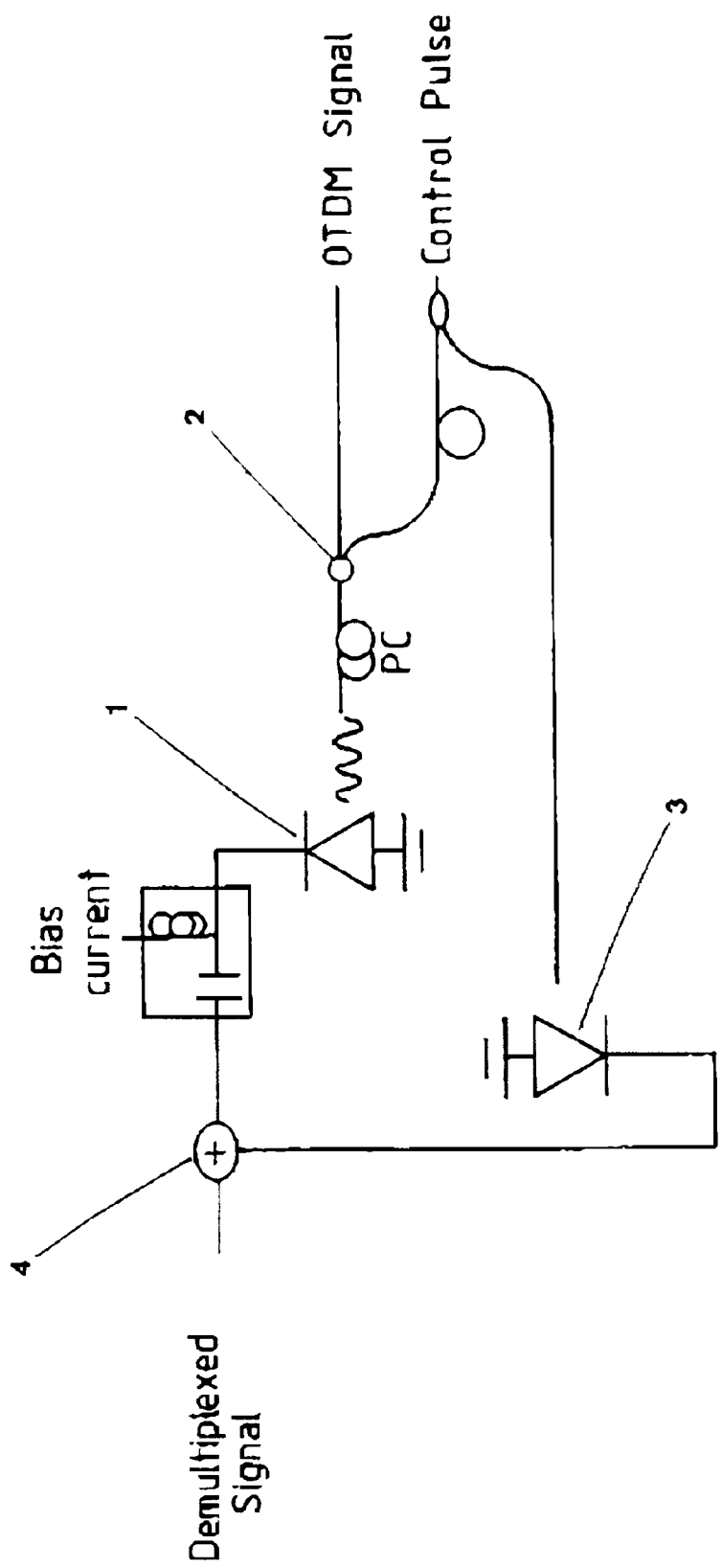
FIG. 1 shows a form of demultiplexer circuit of the invention.

FIG. 1 shows a demultiplexer circuit of the invention for demultiplexing a channel from an OTDM signal comprising a number of multiplexed channels. The opto-electronic device 1 used in the circuit shown is a laser diode, but any other form of opto-electronic detector or device or semiconductor wave guide structure in which TPA can occur could alternatively be used. The system uses optical control pulses to demultiplex a high speed OTDM channel via TPA in such a device. The high speed optical time division multiplexed signal and an optical control signal are optically coupled together by optical coupler 2, injected into the opto-electronic device 1. The optical control signal is at the single channel repetition rate for the received multiplexed signal and is synchronised to the channel to be demultiplexed by a variable delay in the control arm.

Electron-hole pairs are generated by two photon absorption effect in the device 1, and due to the non-linear nature of TPA the number of carriers generated is proportional to the square of the incident power. The non-lines nature of the response ensures that there is strong contrast between the TPA signal generated when the control and signal pulses overlap and that generated when they arrive independently, so that a significant electrical signal replicating the detected channel is generated in the external circuit. Other channels which are not synchronised to the control pulse stream are absorbed linearly and do not generate a significant signal in the device.

The maximum switching speed is determined by the duration of the optical pulses (as the TPA effect itself is essentially instantaneous), and the individual data rate of the channels in the received OTDM signal. This is limited only by the electrical response of the opto-electronic device used. A laser diode may optionally be reverse biased as shown, as far as possible without damaging the diode to maximise the response rate of the diode and thus the signal speed which may be detected. All-optical demultiplexing at bit rates up to 1 T bit/s in an optical time division multiplex network may be possible.

For optimal operation, the control pulses are adjusted to have a larger intensity than the signal pulse, for example a control-to-signal power ratio at least 5:1 and preferably 20:1 (or higher). In the latter case, with the relative delay adjusted for the independent arrival of signal and control pulses, the electrical response due to the signal is 400 times (26 dB) less than that due to the control, so that there is a constant background dominated by the control pulses. With adjustment of the delay so that the signal and control pulses overlap in the detector, the TPA response is now determined by the superposition of signal and control pulses.

In order to subtract the constant signal generated in the device the control pulse stream may also be linearly detected by opto-electronic device 3 such as a laser diode, and subtracted from the overall electrical signal from the device 1 in combiner 4. The level of the signal from the device 3 is adjusted such that, when it is subtracted from the overall electrical signal from the device 1, that part of the TPA signal due to the control pulses is eliminated and the resulting signal is solely due to the demultiplexed data channel. Thus in the case of a control-to-signal power ratio of 20:1, after background subtraction of the control pulses, the output of the demultiplexer consists of the demultiplexed signal and the negligible unswitched signal channels (which do not overlap with the control), with an extinction ratio of 16 dB between them. The negligible TPA response to the independently arriving signals also ensures that detector saturation does not occur in high bit rate systems.

While the use of a laser diode is referred to above, as stated other devices may be used such as for example a custom designed wave guide structure with anti-reflection coatings to improve coupling of the optical signal into the TPA device, to provide extremely efficient optical switching.

We have performed experiments using 500 fs duration control and signal pulses at 1.5 $\mu$m generated using a passively modelocked fibre figure-of-eight laser followed by a soliton compression state. The laser pulses were split into control and signal pulse trains and, to simulate a 330 Gbit/s signal, the signal pulse stream was further split in two and subsequently recombined with a delay of 3 ps between pulses. The relative intensities of the control and signal pulses were adjusted to give a control to signal pulse power ratio of 10:1, corresponding to control and individual signal pulse peak powers of 10 and 1W respectively. The control and signal pulses were then recombined before being coupled into a commercially available InGaAsP 1.3 $\mu$m Fabry-Perot laser diode.

Figure 2A:
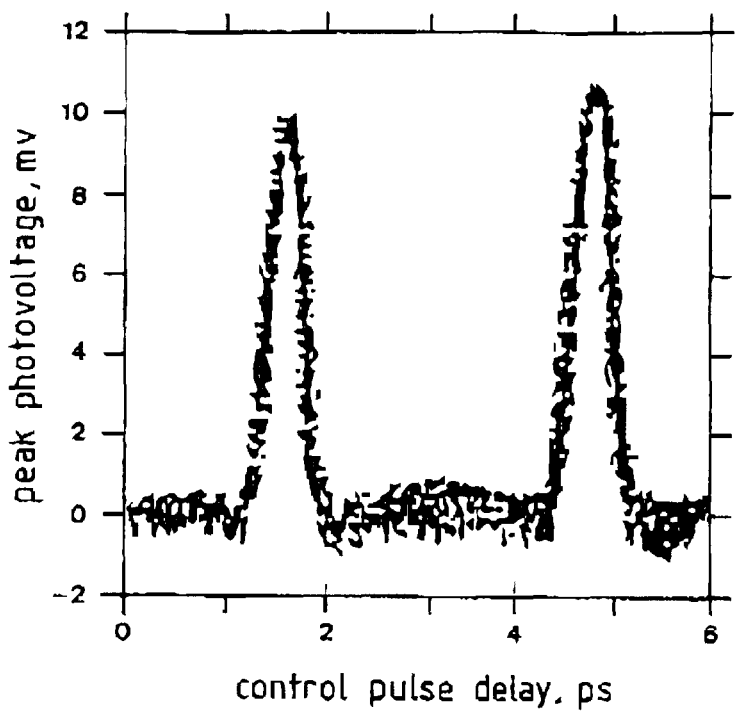
FIGS. 2a and 2b are curves indicating the switching window and output electrical TPA signal in a circuit configured generally as in FIG. 1 arranged to detect a 330 G/bit signal (and further described below)
Figure 2B:
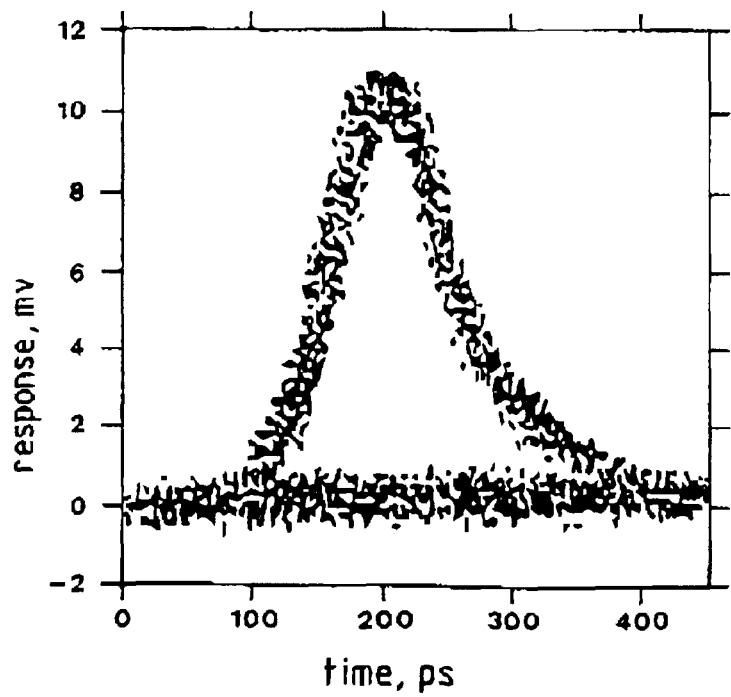

To determine the duration of the switching window, the control pulse was swept across the two signal pulses by adjusting the relative delay between control and signal, and the peak TPA signal from the laser diode was measured using a 32 GHz oscilloscope. FIG. 2a displays the peak photovoltage as a function of delay, after background subtraction of the control pulse signal, clearly showing that switching of a 330 Gbit/s pulse stream can be achieved. In addition, the switching window duration of ~650 fs indicates that demultiplexing at bit rates in excess of 1 Tbit/s is feasible using a TPA-based all-optical demultiplexer of the invention. The switching windows shown in this Figure are essentially the crosscorrelation function of the signal and control pulses. Thus it is simply their pulse durations which determine the maximum switching speed obtainable, as the TPA response is essentially instantaneous. FIG. 2b displays the pulse which is switched out and detected via TPA (after background subtraction) when the control is synchronised and overlapped with one of the two signal pulses. The TPA signal generated by the adjacent signal pulse 3 ps away is negligible, since this signal and the control do not overlap. The baseline in FIG. 2b shows the negligible signal obtained when the optical signal pulse overlapping with the control is blocked, indicating a good extinction ratio. The electrical response time of the laser diode is ~200 ps (from FIG. 2b) which would allow individual data channels at bit rates of up to 2.5 Gbit/s to be used.

Figure 3A:
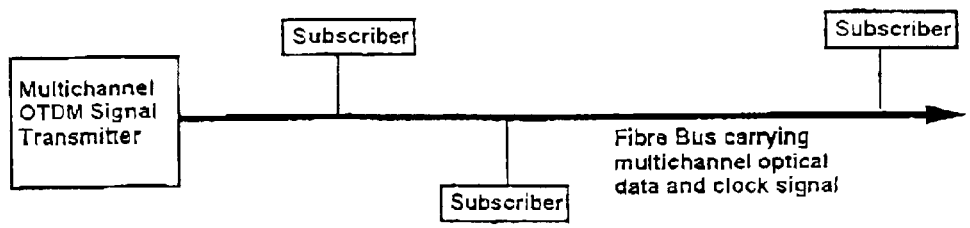
FIGS. 3a and 3b illustrate application of the invention in the distribution of multiplexed video channels in a subscriber cable television network, to detect the subscriber selected channel at each subscriber location, FIG. 3a schematically illustrating such a distribution network and FIG. 3a illustrating use of a demultiplexer of the invention at one subscriber location.
Figure 3B:
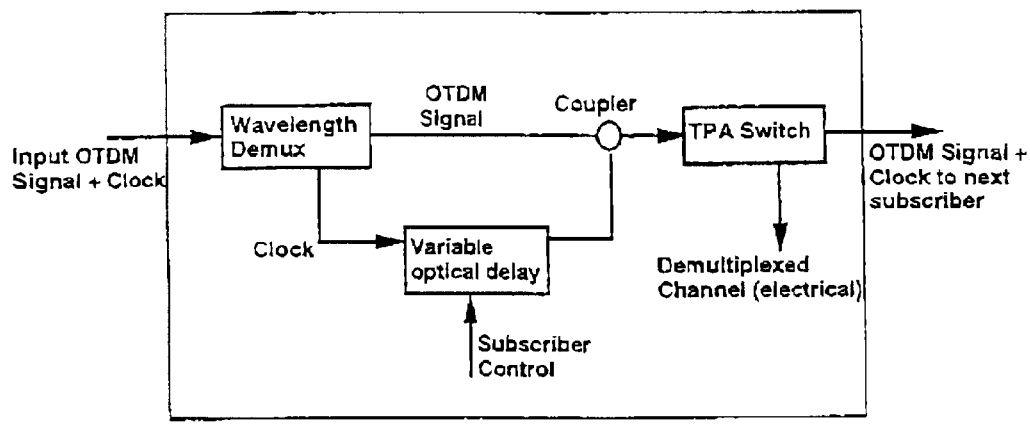

FIGS. 3a and 3b illustrate by way of example an application of the invention in the distribution of multiplexed audio-video channels in a subscriber cable television network. Referring to FIG. 3a, subscribers are connected to a common optical bus formed by an optical fibre cable which carries the transmitted multi-channel OTDM signal, each channel comprising a different audio-video programme. The subscriber equipment at each subscriber location includes demultiplexer as schematically illustrated in FIG. 3b. The multi-channel OTDM programme signals and a control optical signal or clock signal are transmitted at different wavelengths and are separated by a wave length demultiplexer. The control or clock optical signal is passed through a subscriber controllable variable optical delay and is recombined with the OTDM signal, and applied to a TPA switch comprising a demultiplexer circuit as described above. The variable optical delay enables the subscriber to select any desired channel, by varying the delay applied to the control signal, causing the opto-electronic device in the TPA switch to detect the desired channel. The OTDM signal continues on the fibre bus, including the detected channel substantially without attenuation.

The foregoing describes the invention including preferred forms thereof. Alterations and modifications as will be obvious to those skilled in the art are intended to be incorporated within the scope hereof as defined in the following claims.

What is claimed is:

1. A demultiplexer in an optical communication system, comprising an opto-electronic device in which two photon absorption can occur configured in circuit, and means to apply a received optical multi-channel signal to the device, and means to apply a control optical signal to the device at the repetition rate of and synchronised to a selected channel to be detected, said opto-electronic device being so configured in circuit as to generate by non-linear two photon absorption effect in the device a current similar to the original signal.

2. A demultiplexer according to claim 1 also comprising a second opto-electronic device, arranged to detect the control optical signal, and a combiner arranged to combine the output of said second device with the output of said first device configured to detect the original signal by TPA effect, to subtract and substantially remove the part of the TPA effect signal due to the control signal.

3. A demultiplexer according to claim 1 wherein said opto-electronic device configured to detect the original signal by TPA effect is a laser diode or other semiconductor optical detector or a semiconductor wave guide structure.

4. A system for distributing a multi-channel optical time division multiplexed signal to subscribers in a subscriber network, including equipment at subscriber locations comprising a demultiplexer according to claim 1 and means enabling a subscriber to synchronise of the control signal with any channel to select any one of said channels.

5. A method of demultiplexing a selected channel in an optical communication system, comprising applying a received optical multi-channel signal to an opto-electronic device in which two photon absorption can occur configured in circuit and applying a control optical signal to the device which is at the repetition rate of and is synchronised to a selected channel to be detected, to generate by non-linear two photon absorption effect in the device a current similar to the original signal.

6. A method according to claim 5 also comprising detecting the control optical signal via a second opto-electronic device, and combining the output of said second device with the TPA effect signal to subtract and substantially remove the part of the TPA effect signal due to the control pulses.

7. A method according to claim 6 wherein the control pulses have a higher power than the received signal pulses.

8. A method according to claim 7 wherein the ratio of power in the control pulses to power in the received signal pulses is at least 5:1.

9. A method according to any one of claims 5 to 8 wherein said opto-electronic device configured to detect the original signal by TPA effect is a laser diode or other semiconductor optical detector or a semiconductor wave guide structure.

10. A system for distributing a multi-channel optical time division multiplexed audio and/or video signal to subscribers in a subscriber network, comprising means to separate an optical control signal from the transmitted multi-channel signal, an opto-electronic device in which two photon absorption can occur arranged to receive the optical multi-channel signal and the optical control signal and to detect a selected channel with which said control signal is synchronised, by non-linear two photon absorption effect in the opto-electronic device, and a subscriber controlled variable optical delay enabling the subscriber to select any one of said channels.

\* \* \* \* \*